United States Patent
Rugg et al.

(10) Patent No.: US 8,423,504 B2
(45) Date of Patent: Apr. 16, 2013

(54) METHOD OF AND APPARATUS FOR ANALYSING DATA FILES

(76) Inventors: Gordon Rugg, Shropshire (GB); Edward James de Quincey, Stoke-on-Trent (GB)

( * ) Notice: Subject to any disclaimer, the term of this patent is extended or adjusted under 35 U.S.C. 154(b) by 0 days.

(21) Appl. No.: 13/057,580

(22) PCT Filed: Aug. 6, 2009

(86) PCT No.: PCT/GB2009/001934
§ 371 (c)(1),
(2), (4) Date: Apr. 27, 2011

(87) PCT Pub. No.: WO2010/015829
PCT Pub. Date: Feb. 11, 2010

(65) Prior Publication Data
US 2011/0202516 A1    Aug. 18, 2011

(30) Foreign Application Priority Data
Aug. 7, 2008    (GB) .................................... 0814468.5

(51) Int. Cl.
*G06F 17/30*    (2006.01)

(52) U.S. Cl.
USPC ............ 707/609; 707/625; 707/802; 707/803

(58) Field of Classification Search .................. 707/609, 707/625, 696, 802–803; 706/12, 60
See application file for complete search history.

(56) References Cited

U.S. PATENT DOCUMENTS

| | | | |
|---|---|---|---|
| 2003/0115191 A1* | 6/2003 | Copperman et al. ............... | 707/3 |
| 2005/0216443 A1* | 9/2005 | Morton et al. ..................... | 707/3 |
| 2005/0267871 A1* | 12/2005 | Marchisio et al. ................. | 707/3 |
| 2010/0138366 A1* | 6/2010 | Zhang .............................. | 706/12 |

FOREIGN PATENT DOCUMENTS

| WO | WO 2007/004069 | 1/2007 |
|---|---|---|
| WO | WO 2008/011091 | 1/2008 |

* cited by examiner

*Primary Examiner* — Hanh Thai
(74) *Attorney, Agent, or Firm* — Nixon & Vanderhye P.C.

(57) ABSTRACT

A system including a server, a search engine, and one or more user devices is used to analyse data files. The user devices may be used to effect a search, such as a search for documents, websites or other material. A search request is effected on the user device and forwarded to the server. A subject data file is obtained which represents a document. The subject data file is searched for instances of data representing user selected target features. The detected instances which include one or more of features indicative of a list and features indicative of content relating to a casual convention, are changed to be perceptibly different from features which are not target features when the modified data files is provided to the user.

25 Claims, 9 Drawing Sheets

Types of renewable energy sources include:
- Solar panels;
- Wind turbines;
- Wave power;

and
- Geothermal energy.

FIG. 6a

Types of renewal energy sources include:
113 — • Solar panels;
113 — • Wind turbines;
 • Wave power;
and
 • Geothermal energy.

FIG. 6b

Types of renewal energy sources include:
114 — 1. Solar panels;
 2. Wind turbines;
114 — 3. Wave power;
and
 4. Geothermal energy.

FIG. 6c

Various types of renewal energy sources are known. These have different advantages and disadvantages.

Types of renewal energy sources include:
- Solar panels;
- Wind turbines;
- Wave power;

and
- Geothermal energy.

... bad diet causes cancer ...

... cancer is linked with poor diet ...

... poor diet is investigated. It is thought to be a cause of cancer .

METHOD OF AND APPARATUS FOR ANALYSING DATA FILES

This application is the U.S. national phase of International Application No. PCT/GB2009/001934 filed 6 Aug. 2009 which designated the U.S. and claims priority to Great Britain Patent Application No. 0814468.5 filed 7 Aug. 2008, the entire contents of each of which are hereby incorporated by reference.

The present invention relates to analysing data files.

In one aspect, examples of the invention provide a method comprising:

receiving a subject data file which represents a document;

searching the subject data file for instances of data representing user-selected target features;

modifying the subject data file to change detected instances to perceptibly different from features which are not target features, when the modified data file is provided to a user;

providing the modified data file to a user;

and wherein the subject data file is searched for instances including one or more of the following target features:

(a) features indicative of a list; and (b) features indicative of content relating to a causal connection.

The subject data file may be modified to change the appearance of detected instances, relative to the appearance of features which are not target features, when the modified data file is used to display the represented document for a user. The subject data file may be provided aurally to the user. The features may be represented by sounds. Target features and features which are not target features may be represented by different sounds. A group of consecutive features which are not target features may be represented by a further different sound. Each different sound may be at a respective pitch.

The subject data file may be modified to change detected instances of user-selected target words or phrases, relative to other words or phrases. The method may further comprise receiving user-selected criteria defining target features, and storing those criteria for use when searching a subject data file. The method may further comprise receiving a search request, effecting a search for data files complying with the search request, retrieving a compliant data file, and searching and modifying the compliant data file as a subject data file.

The search may be effected by means of a search engine or database server. A plurality of compliant data files may be retrieved and may be searched and modified as subject data files. The or each modified data file may be provided for display to a user in fulfillment of a search request.

Modification may change one or more of the following characteristics of appearance of the detected instances, when displayed: colour, size, boldness, italicisation, font. Modification may change the appearance of substantially all features which are not target features. The data file may be modified to represent each word of text in the document as a respective area on a grid. The colour of each grid area may be indicative of the status of the corresponding word as being or not being the whole or part of a target feature. Each target feature may be represented by a respective single area. Features indicative of a list may include bullet points, numbers at the start of the line, commands at the start of the line, and target words and/or phrases in consecutive text blocks.

The invention also provides a modified data file provided in accordance with a method as defined above.

The invention also provides a carrier medium carrying a modified data file as defined in the previous paragraph. The carrier medium may be a transmission medium, the file being carried by a signal propagating on the medium.

In another aspect, examples of the invention provide apparatus comprising:

receive means operable to receive a subject data file which represents a document;

search means operable to search the subject data file for instances of data representing user-selected target features;

modifier means operable to modify the subject data file to change detected instances to be perceptibly different from features which are not target features when the modified data file is provided to a user; and output means operable to provide the modified data file to a user;

and wherein the search means are operable to search the subject data file for instances which include one or more of the following target features:

(a) features indicative of a list; and (b) features indicative of content relating to a causal connection.

The modifier may be operable to modify the subject data file to change the appearance of detected instances, relative to the appearance of features which are not target features, when the modified data file is used to display the represented document for a user. The output means may provide the subject data file aurally to the user. The modifier may be operable to modify the subject data file to represent the features by sounds. Target features and features which are not target features may be represented by different sounds. A group of consecutive features which are not target features may be represented by a further different sound. Each different sound may be at a respective pitch.

The modifier may be operable to modify the subject data file to change detected instances of user-selected target words or phrases, relative to other words or phrases.

The search means may receive user-selected criteria defining target features, and store those criteria for use when searching a subject data file. The search means may receive a search request, and be operable to effect a search for data files complying with the search request, and to retrieve a compliant data file, and to search the compliant data file as a subject data file for modification by the modifier means.

The search means may effect the search for compliant data files by means of a search engine or database server. The search means may be operable to retrieve a plurality of compliant data files and may be operable to search the plurality of compliant data files as subject data files. The output means may be operable to provide the or each subject data file, after modification by the modifier means, for display to a user in fulfillment of a search request.

The modifier means may change one or more of the following characteristics of appearance of the detected instances, when displayed: colour, size, boldness, italicisation, font. The modifier means may change the appearance of substantially all features which are not target features. The modifier means may modify the data file to cause each word of text in the document to be represented as a respective area on a grid. The colour of each grid area may be indicative of the status of the corresponding word as being or not being the whole or part of a target feature. Each target feature may be represented by a respective single area. Features indicative of a list may include bullet points, numbers at the start of the line, commands at the start of the line, and target words and/or phrases in consecutive text blocks.

The invention also provides computer software which, when installed on a computer system, is operable to cause the computer to function as apparatus as defined above.

The invention also provides a carrier medium carrying computer software as defined in the previous paragraph.

In a further aspect, examples of the invention provide a data structure comprising:

a list of user-selected target features of a subject data file which represents a document;

a list of required perceptible forms for the or each target feature a modified subject data file in which at least one instance of at least one target feature is in a form to cause that instance to conform to the required perceptible form when the modified data file is provided to a user;

and wherein the list of target features includes at least one of the following:

(a) features indicative of a list; and (b) features indicative of content relating to a causal connection.

The modified subject data file may have modified the appearance of detected instances, relative to the appearance of features which are not target features, when the modified data file is used to display the represented document for the user. The modified subject data file may be modified to represent the features by sounds when the subject data file is provided aurally to the user. Target features and features which are not target features may be represented by different sounds. The group of consecutive features which are not target features may be represented by a further different sound. Each different sound may be at a respective pitch.

The modified subject data file may have modified detected instances of user-selected target words or phrases, relative to other words or phrases.

The modified subject data file may have modified one or more of the following characteristics of appearance of the detected instances, when displayed: colour, size, boldness, italicisation, font. The modified subject data file may have modified appearance for substantially all features which are not target features. The modified subject data file may cause each word of text in the document to be represented as a respective area on a grid. The colour of each grid area may be indicative of the status the corresponding word as being or not being the whole or part of a target feature. Each target feature may be represented by a respective single area. Features indicative of a list may include bullet points, numbers at the start of the line, commands at the start of the line, and target words and/or phrases in consecutive text blocks.

Examples of the present invention will now be described in more detail, by way of example only and with reference to the accompanying drawings, in which.

Figure 4:
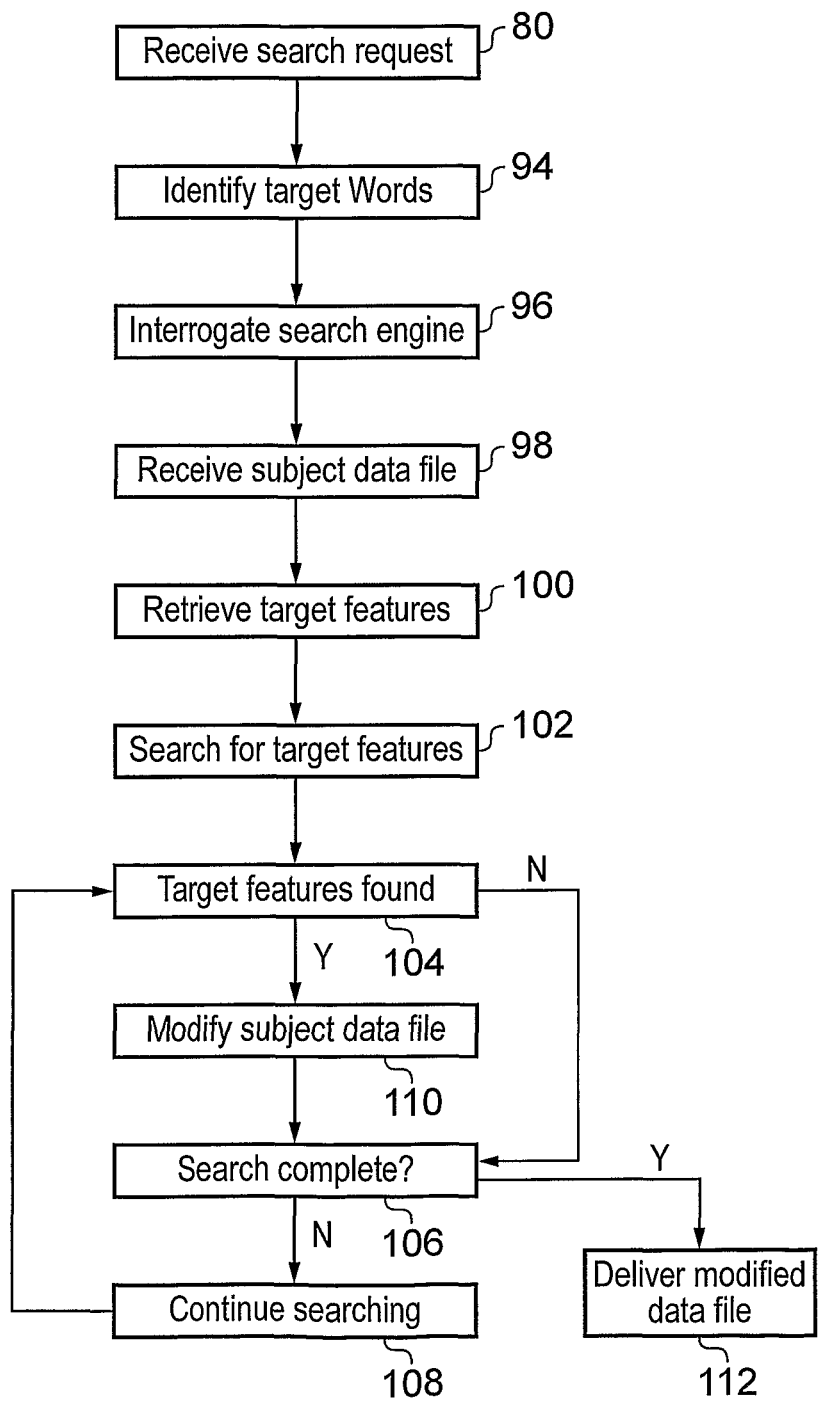
FIG. 4 is a simple flow diagram of a method used in the invention.
Figure 5:
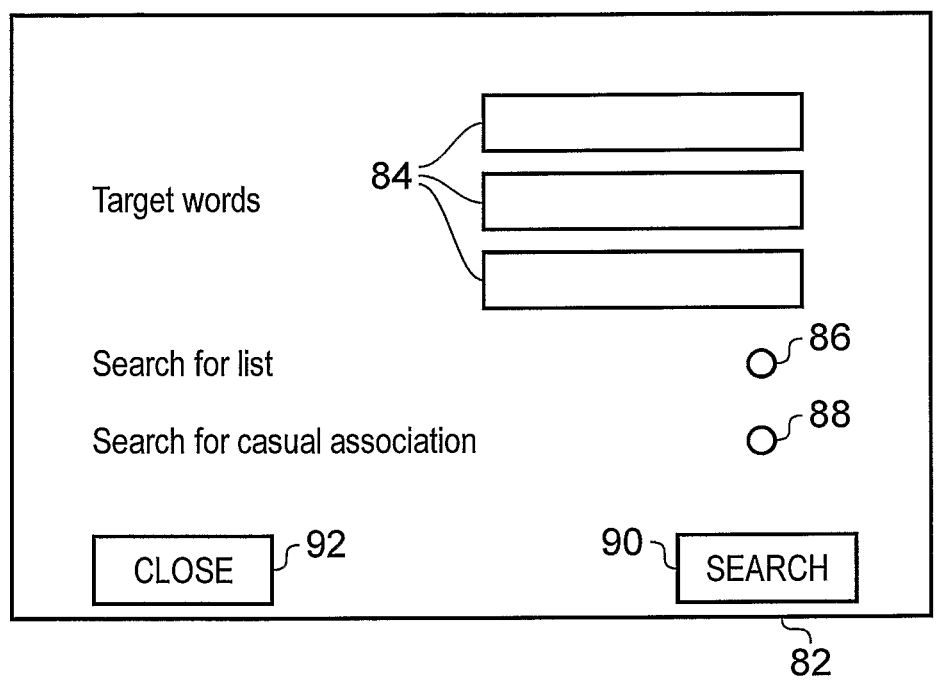
Figures 6D, 7:
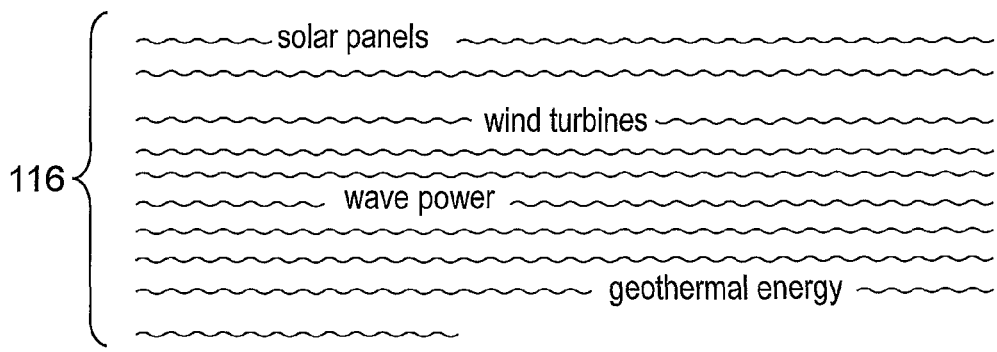
Figure 8:
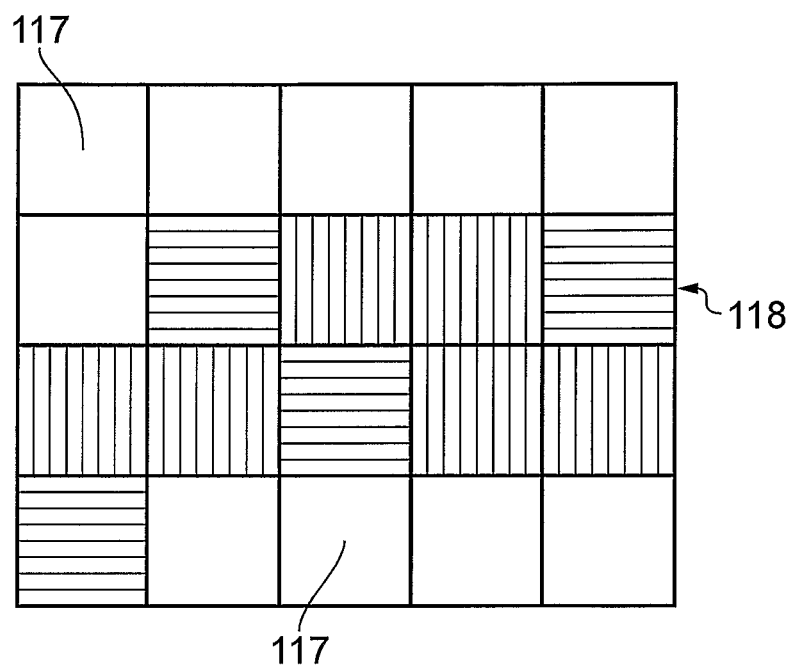
Figure 9:
Figure 9:
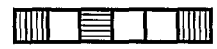
Figure 9:

FIG. 5 schematically illustrates a dialogue box used within the method of FIG. 4;

FIGS. 6a to 6d illustrate examples of text blocks for which a search is made in the method of FIG. 4;

FIG. 7 illustrates the text block of FIG. 6a marked up in accordance with the method of FIG. 4; and FIGS. 8 and 9 illustrate a simple graphical form in which the results of the search of FIG. 4 can be represented.

OVERVIEW

Figure 1:
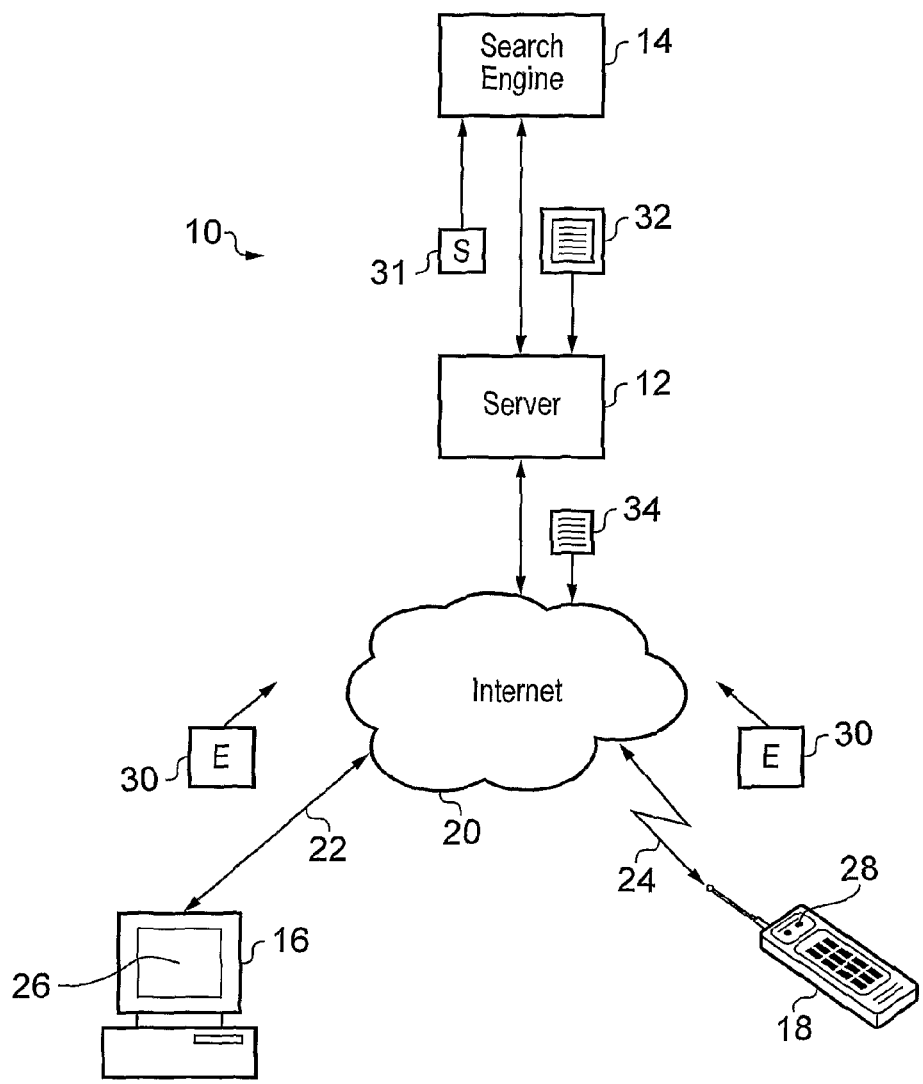
FIG. 1 is a schematic diagram of a system for analyzing data files.

FIG. 1 is a simple schematic diagram of a system for analysing data files. The system 10 includes a server 12, a search engine 14, and one or more user devices 16, 18.

The server 12 may be a network server or a remote server, such as the server of an Internet service provider. The search engine 14 may be implemented as a separate device (as illustrated) and at a separate location, or may be incorporated within the functionality of the server 12.

In this example, the user devices 16, 18 are shown in communication with the server 12 by means of Internet connections indicated generally at 20, but other communication provision can be envisaged, such as fixed private wiring, local network connections, mobile communication networks etc. In this example, the user device 16 is connected to the Internet 20 by fixed wiring 22. The device 16 may, for example, be a personal computer at the home or office of the user. The user device 18 is connected to the Internet 20 by a mobile communication network indicated at 24. The device 18 may for example, be a mobile device such as a mobile telephone, mobile data terminal or the like.

The user devices 16, 18 each have a display 26, 28, as will be described in more detail below.

When the system 10 is in use, one of the devices 16, 18 may be used by a user to effect a search, such as a search for documents, websites or other material. In order to do this, a search request 30 is formulated on the device 16, 18 and forwarded to the server 12. The server 12 receives the search request 30 and effects a search for data files complying with the search request. In this example, the search is effected by means of a search request 31 to the search engine 14. Alternatively, the search could be effected by a database server or other means. A compliant data file 32 is retrieved by the server 12 from the search engine 14. The data file 32 is termed "compliant" because it meets the search criteria of the request 30. In accordance with the invention, the compliant data file 32 becomes a subject data file within the server 12, and is subjected to a search and modification by the server 12. The nature and purpose of the search and modification will be described below.

The resulting modified data file 34 is forwarded to the device 16, 18 for display to the user.

DEFINITIONS

In this document, the term "document" is used to encompass a word processor document, website content or other textual matter for which a user may wish to search. The terms "file" and "data file" are used to refer to the form in which such a document is encoded to be computer readable and processable.

The term "user-selected" is intended to encompass user selection of individual items, or selection of preset items or groups of items, or selection of an option which dictates selection of a preset item or group of items.

The term "perceptibly different" is intended to include any difference which is perceptible to a human user, using any human sense. In particular, but not exclusively, the term is intended to include any difference which is visually or aurally perceptible.

The term "relative appearance" is intended to include differences in colour, shading, intensity, boldness, size, font, italicisation or other visually detectable variation.

The term "text block" is intended to encompass a sentence, a paragraph or other section of text.

Server

Figure 2:
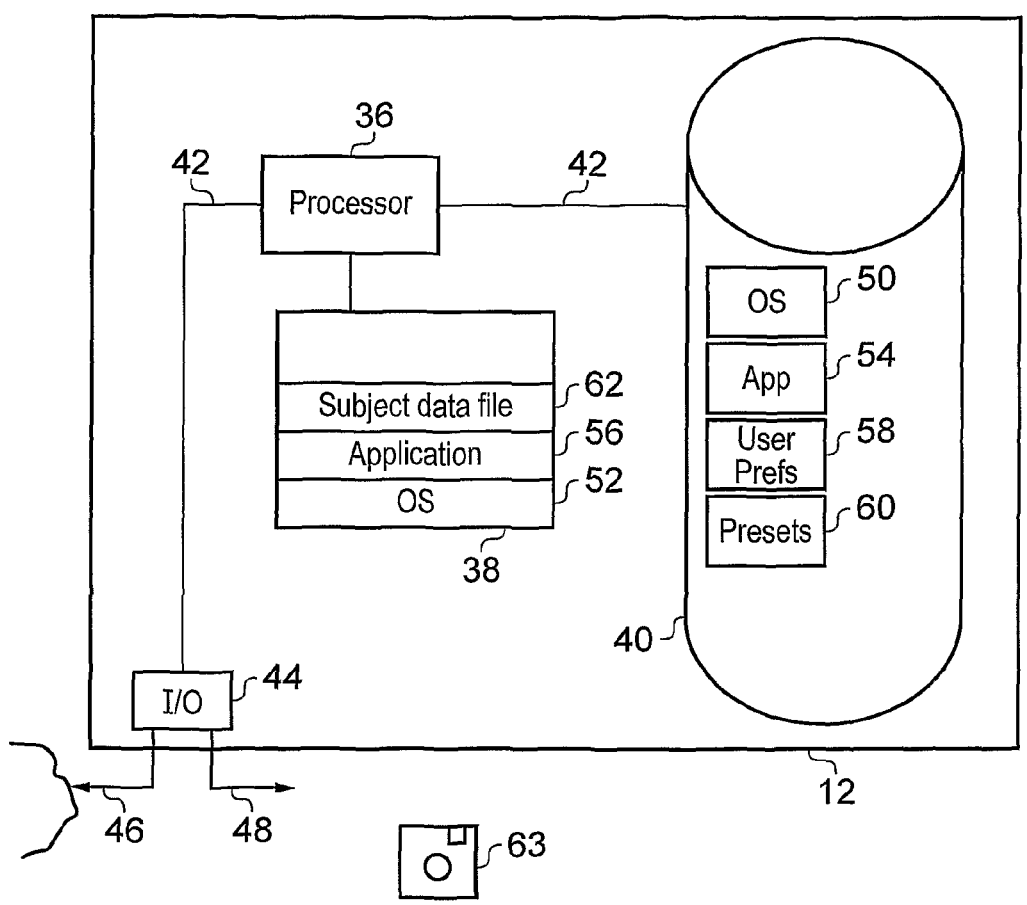
FIG. 2 is a schematic diagram of the server of the system of FIG. 1.

FIG. 2 schematically illustrates components within the server 12, which contribute to the performance of the invention.

The server 12 is based around a processor 36 having temporary memory 38 and permanent memory 40. The processor 36 communicates with the permanent memory 40 by means of a bus 42 which also allows communication with input/output systems at 44, for communication with user devices at 46 and with the search engine 14 at 48.

The permanent memory 40 contains an operating system 50 for the processor 36, which is loaded, for execution, to the temporary memory 38, at 52. Permanent memory 40 also includes applications 54 to be loaded, for execution, to the temporary memory 38, at 56.

The memory 40 also contains data. In this example, the data includes user preferences 58, and preset data 60. The data 58, 60 is used during execution of the method being described.

Applications 54 may be delivered to the server 12 by a wireless or wired communication, or by means of a storage medium 63 for communication with the server 12 by means of the input/output systems at 44. The applications 54 consist of software providing instructions for the processor 36, to cause the processor 36 to execute the server operations to be described below.

A subject data file received from the search engine 14 is temporarily stored in the memory 38, at 62.

User Device

Figure 3:
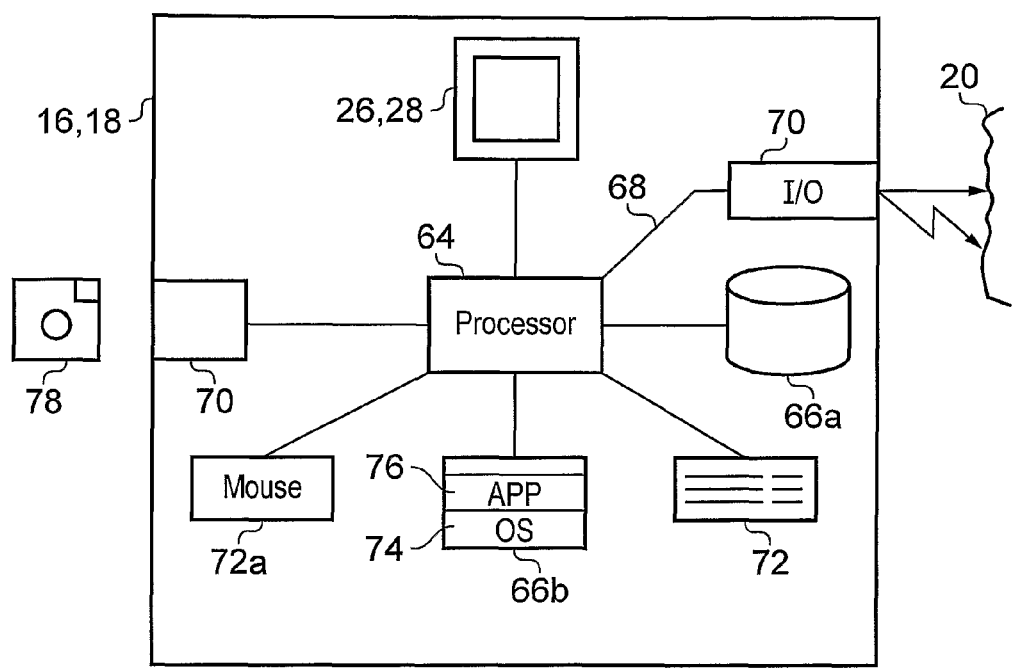
FIG. 3 is a schematic diagram of a user device of the system of FIG. 1.

FIG. 3 illustrates one of the devices 16, 18 in more detail. At the level of description necessary for a full understanding of the invention, the construction of the devices 16, 18, and the function of the various components of the devices, is substantially the same or similar in each case. Accordingly, only one such device is described with a description which the skilled reader will readily be able to apply to a fixed device 16 or a mobile device 18.

The device 16, 18 is based around a processor 64. Memory 66 is associated with the processor 64. A bus 68 provides communication between the processor 64 and input/output systems 70. The input/output systems 70 provide an indication with the Internet 20. In the case of the device 16, the input/output systems 70 may include a modem. In the case of the device 18, the input/output systems may include a radio transceiver for wireless communication with the mobile network 24. User facilities such as a display 26, 28 and user controls 72 also provided. In the case of the device 16, these may be a separate keyboard 72, mouse 72a or other cursor control device, monitor 26 or other display device. In the case of the device 18, appropriate input/output devices, keyboard, keypad, display 28 and other features may be incorporated within a single integrated device.

The memory 66 is divided into permanent memory 66A, and temporary memory 66B. In use, an operating system 74 is loaded to the memory 66B to control the operation of the processor 64. An application 76 is loaded to the memory 66B to be executed within the operating system 74.

The application 76 may be delivered to the device 16, 18 by wireless or wired communication, or by means of a storage medium 78 for communication with the device 16, 18 by means of the input/output systems at 70. The application 76 consists of software providing instructions for the processor 64, to cause the processor 64 to execute the operations of the appropriate device 16, 18, to be described below.

Server Operation

FIG. 4 is a simple flow diagram illustrating the principal operations executed by the server 12, during one example of implementation of the invention.

Operation begins at step 80 with the receipt of a search request 30 from a device 16, 18. The request 30 will be in the form of a request to effect a search for data files complying with the search request by containing target words identified to the server 12 by the user, in the request 30. A mechanism for this is illustrated in FIG. 5, which illustrates a dialog box 82 presented to the user on the display 26, 28. Fields 84 are provided for the user to enter target words for which the server 12 will search. The fields 84 can be completed by appropriate manipulation of a cursor control device, keyboard etc. In this example, three fields 84 are illustrated. Another number of fields could be chosen or the target words could be entered in another way. For example, a single field could be provided for target words to be entered as a Boolean string.

The dialog box 82 also provides two other fields 86, 88 for toggling the state of the request as a search for a list (field 86) or a search for a causal association (field 88). Fuller details of the purpose and significance of the fields 86, 88 will be set out below.

Once the user has completed the dialog box 82, the button 90, labelled "search" is pressed, to dispatch the search request 30 the server 12. Alternatively, the user may cancel the operation by pressing the button 92, labelled "close".

Returning to FIG. 4, it can now be seen that the server 12 can readily identify target words at step 94, from a search request 30 generated from a dialog box 82. Accordingly, the server 12 interrogates the search engine 14 (step 96) by sending a search request 31 requesting the search engine 14 to identify data files containing the target words. One or more data files is identified to the server 12 by the search engine 14 as a result of the search, and the or each compliant data file 32 (compliant in meeting the requirements of the search request as defined by the target words) is retrieved by the server 12 (step 98) to form a subject data file for subsequent processing by the server 12.

At step 100, the server 12 retrieves target features (step 100) for which the compliant data file 32 is to be searched. These target features may be preset or user preferences, and may be retrieved by the server 12 from the memory 40. If the user has toggled field 86 to "on", to request a search for a list, the target features will include features indicative of a list, such as: bullet points; numbers or tab key commands at the start of consecutive lines; and target words appearing in consecutive text blocks. If the user has toggled field 88 to "on", to request a search for a causal connection, the target features will include terms and phrases such as "caused", "caused by", "linked to".

The compliant data file 32 is searched at step 102. The presence of a target feature is continuously monitored (step 104) and if not present, step 106 monitors for the completion of the search, i.e. that the whole of the document has been searched. If not, step 108 causes searching to continue at step 104.

If step 104 determines that a target feature has been located within the compliant data file 32, the data file 32 is modified (step 110), as will be described.

When step 106 determines that the search is complete, the data file 32, as modified by step 110, is delivered at step 112, as the modified data file 34.

Modified Data File

An example of the nature of the modifications which may be made at step 110, and the effect of the modified data file 34 for the user, can now be described in more detail by reference to examples illustrated in the remaining drawings. In this example, the modified data file 34 is intended to be displayed to the user. In an alternative, described later, the subject data file may be provided aurally to the user.

FIG. 6 shows various forms in which simple text might appear in a compliant data file 32 retrieved from the search engine 14 and used as a subject data file for the search set out in steps 102 to 110.

In FIG. 6a, information is provided as text in the form of a list, the elements of the list being identified on separate lines, each indented by a tab key command.

In FIG. 6b, information is provided in the form of a list, the elements of the list being identified by bullet points 113.

In FIG. 6c, similar information is provided in the form of a list, the elements of the list being identified by item numbers 114.

In FIG. 6d, more detailed information is provided in the form of a set of paragraphs 116. However, it can be seen that each paragraph is a block of text which includes a reference to one of the items in the lists of FIGS. 6a-c. Each paragraph 116 includes the words from one element of the lists, as part of a more detailed information item. The paragraphs therefore form a type of list.

In these examples, the methods being described will be useful for a user who is searching for information related to information he knows, but different from it. For example, suppose that a user knows that solar panels, wind turbines and wave power are all examples of renewable energy sources, but wishes to research additional examples, unknown to the user. Accordingly, the target words entered into the dialog box 82 by the user would be, in this example, "solar panels", "wind turbines", "wave power".

In addition, the user toggles field 86 on, so that the server 12 will search for target features indicative of a list. In these examples, the presence of a list is indicated either by the presence of a series of tab key instructions at the beginning of consecutive lines (FIG. 6a), or of bullet points at the beginning of each line (FIG. 6b) or of numbers, at the beginning of each line (FIG. 6c), or of separate paragraphs, each containing one of the target words (FIG. 6d).

When these target features are found by the search (step 104), the subject data file is marked. In addition, the location of the target words is marked. In this example, it is not necessary to distinguish between the different target words—any target word may be marked in the same way. However, it is advantageous to distinguish between the marking of a target feature and a target word.

FIG. 7 illustrates the data file of FIG. 6a, marked up in a manner which is for illustrative purposes only, but shows the target features indicative of a list, underlined in a zigzag manner, and the target words underlined in a normal manner.

In addition to marking the target features and target words, the modified data file is converted to a very simple graphic representation of the underlying subject data file, as illustrated in FIG. 8. FIG. 8 illustrates a grid of squares 117, each square of the grid corresponding with a separate word in the underlying subject data file, or with an occurrence of a target feature. Pagination is not retained from the underlying text. Each square corresponding with a target word is marked, in this case by vertical shading, but in a practical example, by a particular colour. Each square corresponding with a target feature is marked, in this case by horizontal shading, but in practical example, by an alternative colour. Each square which corresponds with neither a target word nor a target feature, but with a word which is not a target word, is left unmarked, uncoloured or marked or coloured in a different manner. The result, as can be seen from FIG. 8, provides a very simple graphic representation of the underlying subject data file, but from which a user can easily identify the existence of a list 118 (by the horizontal shading of grid squares) which includes several target words (indicated by the vertical shading of grid squares). Since this document clearly includes a list, which clearly includes several target words and which also clearly includes at least one other word which is not a target word (indicated by a horizontally shaded square followed by an unshaded square), the user can readily identify the underlying subject data file as being of potential interest. The user can therefore request delivery of the unmodified subject data file, as illustrated in FIG. 6. The user will then find that the list identified from the grid of FIG. 8 does indeed contain the three target words, together with a fourth set of words ("geothermal energy"). This provides the user with the additional information that "geothermal energy" is a further term relevant to the subject matter in hand (broadly, a type of synonym with the target words). Further searches of conventional or other form can then be made by the user to further supplement their knowledge about geothermal energy.

FIG. 9 illustrates another example. In this case, the user has requested a search relating to the target words "diet" and "cancer", seeking to investigate literature relating to the Possibility that diet has a causal association with cancer. This search is requested by the user by entering the target words in the dialog box 82, and toggling the field 88 on.

FIG. 9 illustrates, on the left-hand side, three examples of phrases which might arise in documents of potential interest to the user. On the right, FIG. 9 illustrates the corresponding section of a square grid, such as that described above in relation to FIG. 8, derived in a manner similar to that described above, except as follows. In this example, target words are identified by vertical shading but, in practice, may be by means of an appropriate colour. Target features, in this case, are the occurrence of words which indicate causal association, such as the words "causes", "linked", or a phrase such as "thought to be". The occurrence of target features is indicated by horizontal shading in FIG. 9, but in practice, may be by means of an alternative colour. Words which are not target words or target features are left unmarked or, in practice, may be noted by means of a third colour.

In the example of the top line of FIG. 9, the user is presented with a very clear graphic representation of the phrase to the left, by the grid squares to the right. This shows that two target words are present, separated only by a target feature. This strongly suggests that the underlying document is discussing a causal association between target words and is therefore likely to be of significant interest to the user. This is indeed the case, because the document includes the phrase "bad diet causes cancer", which is a strong statement relating to the causal association of interest to the user.

In the example of the middle line of FIG. 9, the statement to the left is less strong than the statement in the upper line, but nevertheless potentially of some interest to the user. The user can readily identify this and the likely lower level of interest, from the grid squares to the right, which show that two target words occur in proximity with a target feature, but that the degree of proximity is lower than in the example of the upper line of FIG. 9.

The bottom line of FIG. 9 shows a further example. Again, both target words occur, together with two target features, namely the phrase "thought to be" and the word "cause". The grid squares, illustrated to the right, allow the user to readily identify the occurrence of two target words in proximity with several grid squares relating to target features, so that although the proximity is not so great as in the first two examples, the high number of target features represented is sufficient to indicate that the document is of potential interest.

The occurrence of target features which relate strongly to causal association, such as the word "cause", may be identified in a different manner to the occurrence of target features which relate less strongly to causal association, such as the phrase "thought to be". For example, a strong relation may be indicated by a strong colour and a weak relation may be indicated by a less strong display of the same colour.

For either example, markings of the type indicated illustratively in FIG. 7 will be incorporated in machine readable form in the modified data file, so that when the modified data file is displayed to a user, the appropriate colours, shading etc are rendered to assist the user to find the target words, phrases and features.

OTHER EXAMPLES

In the examples described above, the modified data file has been provided for display to a user. That is, the modified data file, and the represented document, has been provided visually. Alternatively, it may be advantageous or convenient to provide the modified data file in an aural manner to the user. For example, a visually impaired user will find aural delivery advantageous. A normally sighted user may find aural delivery to be convenient, allowing the user to listen while simultaneously executing another task.

When the subject data file is provided aurally to the user, the features are represented by sounds. For example, each word may be represented by a sound. Target features and features which are not target features may be represented by different sounds. For example, the different sounds may be at different pitches. Alternatively, the different sounds may be a monotonic hum (representing a feature which is not a target feature, for example) or a musical motif (representing a feature which is a target feature, for example). Many other choices are different sounds and combinations of different sounds can be envisaged.

If many features which are not target features occur consecutively, the process of a user identifying the relevance of the represented document may be slowed down unnecessarily. Accordingly, a group of consecutive features which are not target features may be represented by a further different sound, such as a monotonic hum at a different pitch.

Thus, in this example, a target feature may be represented by a short musical motif designed to catch the attention of a user, particularly a user listening as a background task, or by a high pitch note. A feature which is not a target feature may be represented by a medium pitch hum of relatively short duration, such as three seconds. A sequence of many consecutive features which are not target features, such as 100 such features, may be represented by a low pitch hum, which may be relatively long, such as four seconds.

Consequently, if the represented document is of little relevance, it is likely to be represented aurally as a sequence of low pitch or medium pitch hums, with relatively few high-pitched notes or musical motifs. Conversely, if the represented document is likely to be relevant, it is likely to be represented aurally as a sequence predominantly containing high-pitched notes or musical motifs, and medium pitch hums, with relatively few low pitch hums.

Expected Advantages

In the examples in which the server searches for a list, the system is expected to provide the user with a convenient way of identifying lists which include terms of known relevance, but also include other terms. Such lists are not readily discoverable by other search apparatus and search methods. For example, a conventional search for a search string such as "alternative energy sources wind wave and solar" would likely produce a large number of hits which only include the three target words "wind", "wave", and "solar", but do not mention any other similar terms. The presence of this large number of hits will mask hits containing these terms and others. Alternatively, if the user searches conventionally for a search string such as "alternative energy sources Not wind Not wave Not solar", all records containing any of the target words would be excluded from the results, so that any records containing the target words in addition to a further unknown target would therefore be excluded. By contrast, following the method described above, the presence of a list containing target words is readily identified, allowing the list to be consulted to see if it also includes additional, unknown terms.

In the alternative examples, looking for causal association, the process allows relevant documents to be identified, even if they have target terms in different sentences, but in proximity and in association with terms which indicate causal connection.

It is to be appreciated that searches for lists or searches for causal connection could be provided alone, or as options for selection.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method wherein a server includes a computer processor to carry out steps comprising:
   receiving a subject data file which represents a document;
   the server searching the subject data file for instances of data representing user-selected target features;
   the server modifying the subject data file to change detected instances to be perceptibly different from features which are not target features, when the modified data file is provided to a user;
   the server providing the modified data file to a user;
   wherein the subject data file is searched for instances including one or more of the following target features:
   (a) features indicative of a list; and
   (b) features indicative of content relating to a causal connection, and
   wherein the modified data file represents each word of text in the document as a respective area on a grid.

2. A method according to claim 1, wherein the subject data file is modified to change the appearance of detected instances, relative to the appearance of features which are not target features, when the modified data file is used to display the represented document for a user.

3. A method according to claim 1, wherein the subject data file is provided aurally to the user.

4. A method according to claim 1, wherein the subject data file is modified to change detected instances of user-selected target words or phrases, relative to other words or phrases.

5. A method according to claim 1, wherein the method further comprises receiving a search request, effecting a search for data files complying with the search request, retrieving a compliant data file, and searching and modifying the compliant data file as a subject data file.

6. A method according to claim 5, wherein the search is effected by means of a search engine or database server.

7. A method according to claim 1, wherein the colour of each grid area is indicative of the status of the corresponding word as being or not being the whole or part of a target feature.

8. A method according to claim 1, wherein each target feature is represented by a respective single area.

9. A method according to claim 1, wherein features indicative of a list may include bullet points, numbers at the start of the line, commands at the start of the line, and target words and/or phrases in consecutive text blocks.

10. A modified data file provided in accordance with a method according to claim 1.

11. Apparatus comprising:
- receive means for receiving a subject data file which represents a document;
- search means configured by a server with a computer processor for searching the subject data file for instances of data representing user-selected target features;
- modifier means configured by the server for modifying the subject data file to change detected instances to be perceptibly different from features which are not target features when the modified data file is provided to a user; and
- output means configured by the server for providing the modified data file to a user;
- wherein the search means includes means for searching the subject data file for instances which include one or more of the following target features:
  - (a) features indicative of a list; and
  - (b) features indicative of content relating to a causal connection, and
- wherein the modifier means includes means for modifying the data file to cause each word of text in the document to be represented as a respective area on a grid.

12. Apparatus according to claim 11, wherein the modifier includes means for modifying the subject data file to change the appearance of detected instances, relative to the appearance of features which are not target features, when the modified data file is used to display the represented document for a user.

13. Apparatus according to claim 11, wherein the output means provides the subject data file aurally to the user.

14. Apparatus according to claim 11, wherein the modifier includes means for modifying the subject data file to change detected instances of user-selected target words or phrases, relative to other words or phrases.

15. Apparatus according to claim 11, wherein the search means receives a search request, and effects a search for data files complying with the search request, and retrieves a compliant data file, and searches the compliant data file as a subject data file for modification by the modifier means.

16. Apparatus according to claim 15, wherein the search means effects the search for compliant data files by means of a search engine or database server.

17. Apparatus according to claim 11, wherein the colour of each grid area is indicative of the status of the corresponding word as being or not being the whole or part of a target feature.

18. Apparatus according to claim 11, wherein each target feature is represented by a respective single area.

19. A carrier medium carrying computer software which, when installed on a computer system, causes the computer to function as apparatus according to claim 11.

20. A data structure assembled and stored by a server including a computer processor, the data structure comprising:
- an electronically stored list of user-selected target features of a subject data file which represents a document;
- an electronically stored list of required perceptible forms for the or each target feature;
- an electronically stored modified subject data file in which at least one instance of at least one target feature is in a form to cause that instance to conform to the required perceptible form when the modified data file is provided to a user;
- wherein the list of target features includes at least one of the following:
  - (a) features indicative of a list; and
  - (b) features indicative of content relating to a causal connection, and
- wherein the modified data file represents each word of text in a document as a respective area on a grid.

21. A data structure according to claim 20, wherein the modified subject data file has modified the appearance of detected instances, relative to the appearance of features which are not target features, when the modified data file is used to display the represented document for the user.

22. A data structure according to claim 20, wherein the modified subject data file is modified to represent the features by sounds when the subject data file is provided aurally to the user.

23. A data structure according to claim 20, wherein the modified subject data file has modified detected instances of user-selected target words or phrases, relative to other words or phrases.

24. A data structure according to claim 20, wherein the colour of each grid area is indicative of the status of the corresponding word as being or not being the whole or part of a target feature.

25. A data structure according to claim 20, wherein each target feature is represented by a respective single area.

* * * * *